ND CONNECTION FOR FLEXIBLE
CABLE OR RODS
Ieuan Gwyn Davies, Llansrechfa, Monmouthshire,
Wales, assignor to Girling Limited, Birmingham,
England, a British company
Filed Apr. 8, 1964, Ser. No. 358,276
Claims priority, application Great Britain, Apr. 9, 1963,
987/63
4 Claims. (Cl. 24—123)

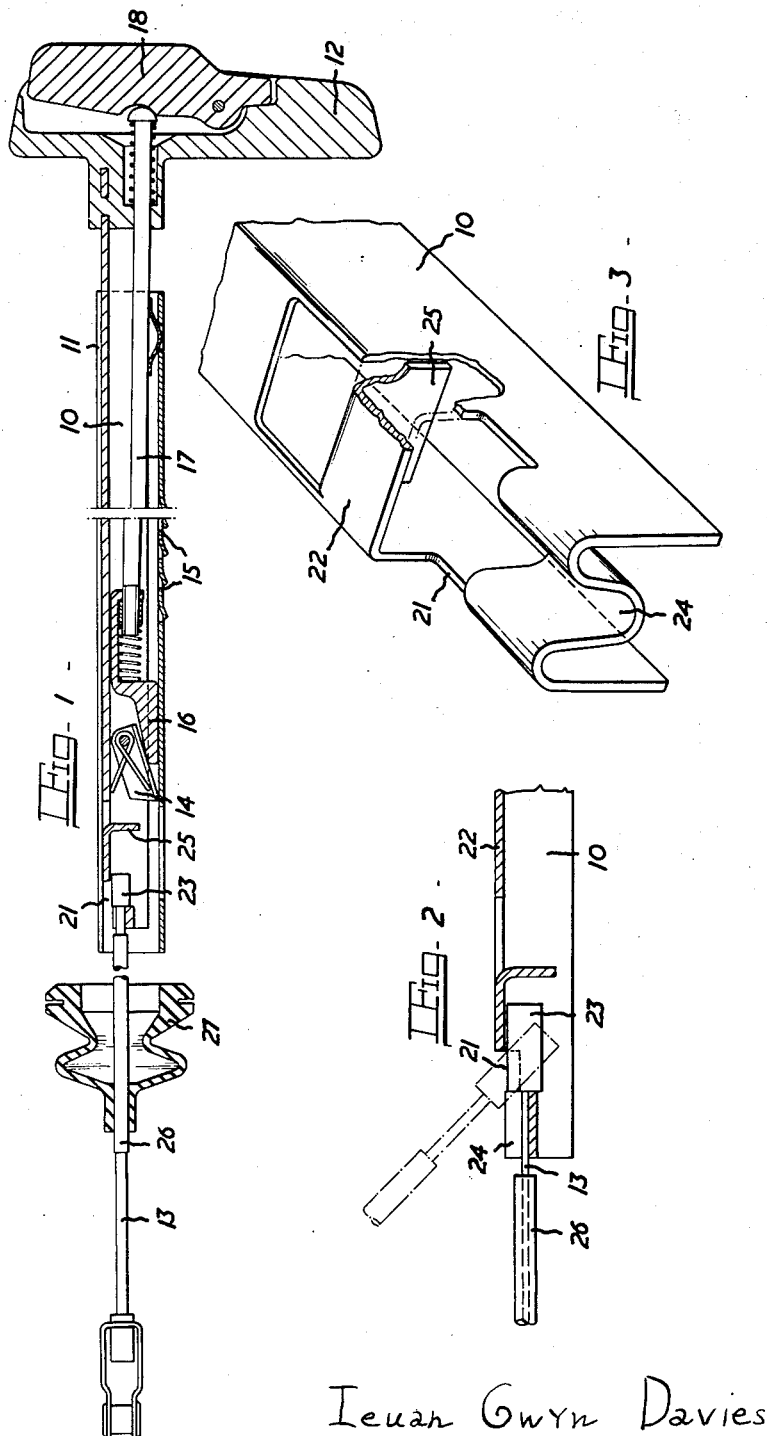

This invention is concerned with the connection of a flexible cable or rod to a member which is actuated by the cable or rod or actuates the cable or rod to transmit movement to another member.

According to my invention, means for connecting a flexible cable or rod to an actuated or actuating member comprises a rigid sleeve fixed on the end of the cable or rod in combination with a part on the member providing an open guide for the cable or rod and an abutment for the sleeve, and another part on the member which is parallel to and is spaced from the guide and is adapted to engage with the sleeve to prevent displacement of the sleeve in a direction substantially at right angles to the guide which is substantially parallel to the normal line of the cable or rod.

The cable or rod is thus effectively attached to the member and cannot become disengaged in the normal operation of the cable or rod by the member or of the member by the cable or rod, but it can be readily disengaged when necessary by moving the cable or rod and sleeve into a position in which they are inclined to the guide and abutment so that the sleeve can be withdrawn through the gap between the guide and the abutment.

Alternatively, the disengagement can be effected by moving the member carrying the guide and abutment into a position in which it is inclined with respect to the cable or rod.

One embodiment of my invention as applied to the connection of a cable to a hand-brake lever is illustrated by way of example in the accompanying drawings in which:

FIGURE 1 is a longitudinal section of the hand-brake lever;

FIGURE 2 is a fragmentary section on a larger scale of the cable connection; and FIGURE 3 is a perspective view partly broken away of the part with which the cable engages.

The hand-brake lever illustrated is of the known type in which a lever 10 of channel section is mounted to slide longitudinally in a housing 11 of rectangular box section adapted to be fixed on the dash or other convenient part of a vehicle. A handle 12 is mounted on the outer end of the lever and a cable 13 leading to the brake is connected to its inner end.

The brake is applied by pulling the lever outwardly by means of the handle and the lever is retained in the applied position by the engagement of a spring-pressed pawl 14 mounted in the lever with any one of a series of ratchet teeth 15 pierced in the bottom wall of the housing. To release the brake the pawl is disengaged from the ratchet teeth by a wedge-shaped shoe 16 slidably mounted in the lever and actuated through a spring-pressed rod 17 by a trigger 18 pivotally mounted in the handle.

For the connection of the cable to the lever a transverse notch 21 is cut in the upper part or web 22 of the lever a short distance from its rear end, the axial length of the notch being substantially less than that of a rigid cylindrical nipple or sleeve 23 fixed on the end of the cable but greater than the diameter of the sleeve. The web of the lever between the notch and the free end is deformed downwardly to provide a longitudinal guide channel 24 of U cross-section to receive the cable. The width of the channel 24 is less than the diameter of the sleeve 23 and the bottom of the channel is displaced downwardly from the plane of the web 22 by a distance slightly greater than the radius of the sleeve.

To fit the cable the sleeve 23 is held in an inclined position as shown in dotted lines in FIGURE 2 and is inserted into the gap between the forward end of the guide 24 and the forward end of the notch 21. The cable is then swung down into alignment with the lever as shown in full lines in FIGURE 2 so that the sleeve is positively located between the web 22 of the lever forward of the notch and the guide 24 of which the forward end forms an abutment for the sleeve. It is thus impossible for the sleeve to become disengaged from the lever so long as the cable is substantially in alignment with the lever which is its normal position.

A stop to limit forward movement of the sleeve relative to the lever may be provided by piercing a tongue 25 out of the web of the lever and bending it down at right angles to the web. Alternatively a stop may be formed by the engagement of a covering 26 for the cable with the rear end of the guide 24, the covering being removed from the cable for a length slightly greater than that of the guide.

The rear end of the housing 11 for the brake lever is preferably closed by a rubber or other boot 27 which excludes dirt and moisture and has an axial opening for the passage of the cable.

While the connection has been illustrated for use with a flexible cable it can equally well be used for connecting a rod to an actuated or actuating member.

I claim:

1. Means for connecting a flexible cable to a part movable with the cable and with which the cable is movable comprising in combination a rigid sleeve on one end of said cable, a connector embodied in said movable part comprising a channel section U-shaped in cross-section, a transverse slot across the web of the channel section, a guide in the web between said slot and an end of the channel section adjacent to the cable, said guide being a U-shaped member extending between the side walls of the channel section, a portion of the web at the opposite end of the slot from the guide forming a wall spaced from the axis of the guide between which and the adjacent end of the guide the sleeve is inserted and the cable is received in the guide, and a portion of the web adjacent to the wall being a struck-out portion extending across an extension of the guide axis to form a stop limiting forward movement of the sleeve relative to the connector.

2. Means for removably connecting a cable or rod end having a head portion thereon, and a tubular or part tubular structure, the head portion being of such dimension as to be received within said structure through an opening in the structure which is spaced axially from one end of the structure, a portion between said end and said opening of said structure being deformed inwardly of said structure to form an end wall which forms an abutment for the head portion and a support for the cable or rod.

3. Means for removably connecting a flexible cable to a part movable with the cable and with which the cable is movable comprising in combination a rigid sleeve on one end of said cable, a connector embodied in said movable part including a channel section U-shaped in cross-section, a transverse slot across the web of the channel section, a guide in the web between said slot and an end of the channel section adjacent to the cable, said guide being a U-shaped member extending between the side walls of the channel section, a portion of the web at the opposite end of the slot from the guide forming a wall spaced from the axis of the guide between which and the adjacent end of the guide the sleeve is inserted and the cable is received in the guide.

4. In a hand-brake applying mechanism for a vehicle brake including a hand-brake lever, and a brake cable having first and second opposite ends and connected at said first end to movable members of the brake and actuated by the hand-brake lever to apply the brake, the combination of a rigid sleeve on said second end of the cable, a connector embodied in said hand-brake lever comprising a channel section U-shaped in cross-section, a transverse slot across the web of the channel section, a guide in the web between said slot and an end of the channel section adjacent to the cable, said guide being a U-shaped member extending between the side walls of the channel section, a portion of the web at the opposite end of the slot from the guide forming a wall spaced from the axis of the guide between which and the adjacent end of the guide the sleeve is inserted and the cable is received in the guide, and a portion in the web adjacent to the wall being a struck-out portion extending across an extension of the guide axis to form a stop limiting forward movement of the sleeve relative to the connector.

References Cited by the Examiner

UNITED STATES PATENTS

| | | | |
|---|---|---|---|
| 534,507 | 2/1895 | Hoagland | 287—103 |
| 709,762 | 9/1902 | Greaves | 287—103 |
| 1,483,274 | 2/1924 | Bouschor | 24—123.1 |
| 1,726,116 | 8/1929 | Needham. | |
| 2,234,602 | 3/1941 | McIntosh. | |
| 2,591,925 | 4/1952 | Erbe. | |

FOREIGN PATENTS 102,108 12/1925 Austria.

WILLIAM FELDMAN, *Primary Examiner.*

BERNARD A. GELAK, *Examiner.*